(12) United States Patent
Kameli (10) Patent No.: US 11,062,592 B2
(45) Date of Patent: Jul. 13, 2021

(54) DANGER ZONE PROTECTION AND ASSISTANCE SYSTEM

(71) Applicant: Nader Kameli, Lombard, IL (US)

(72) Inventor: Nader Kameli, Lombard, IL (US)

(73) Assignee: AKBI Development, LLC, Lombard, IL (US)

( * ) Notice: Subject to any disclaimer, the term of this patent is extended or adjusted under 35 U.S.C. 154(b) by 181 days.

(21) Appl. No.: 16/383,149

(22) Filed: Apr. 12, 2019

(65) Prior Publication Data

US 2020/0327798 A1 Oct. 15, 2020

(51) Int. Cl.
| | |
|---|---|
| G08B 25/00 | (2006.01) |
| G08B 21/00 | (2006.01) |
| G08B 25/01 | (2006.01) |
| H04N 5/247 | (2006.01) |
| G08B 21/02 | (2006.01) |

(52) U.S. Cl.
CPC ....... G08B 25/016 (2013.01); G08B 21/0283 (2013.01); H04N 5/247 (2013.01)

(58) Field of Classification Search
CPC ....... G06N 20/00; H04W 4/90; A61B 5/6892; G08B 25/016; G08B 21/0283; H04N 5/247

USPC .......................................................... 348/143
See application file for complete search history.

(56) References Cited

U.S. PATENT DOCUMENTS

| | | | |
|---|---|---|---|
| 2012/0314063 A1* | 12/2012 | Cirker | G08B 13/19697 348/143 |
| 2014/0320648 A1* | 10/2014 | Sager | H04N 7/181 348/143 |
| 2016/0182170 A1* | 6/2016 | Daoura | H04W 12/033 455/3.01 |
| 2016/0295388 A1* | 10/2016 | Vasic | H04W 4/90 |
| 2019/0198167 A1* | 6/2019 | Durlach | G16H 40/67 |
| 2019/0342556 A1* | 11/2019 | Agrawal | G06F 16/58 |

* cited by examiner

*Primary Examiner* — Albert Kir

(57) ABSTRACT

Embodiments relate to a danger zone protection and assistance system that includes a personal trigger that is used by a user to indicate presence of danger, a microprocessor controlled device that once receives a command from the personal trigger, will use visual alarming and audible alarming capabilities available to summon assistance from people close by, and use cellular calling capability, where available, to summon assistance from people and emergency assistance services remote to the zone of danger.

19 Claims, 7 Drawing Sheets

Video Monitoring System

FIGURE 7

DANGER ZONE PROTECTION AND ASSISTANCE SYSTEM

BACKGROUND

There are many situations where individuals step into that leaves them unprotected and at risk of injury or harm. People take what they see as necessary precaution in light of the situation that they are facing, and do the best they can to be careful and avoid dangers. But many situations leave them vulnerable and does not provide them the means to either protect themselves, or in case of fear of danger, or facing imminent danger, reach out for assistance in a manner that is suitable to the state of mind and physical capability that they are in.

As an example, a delivery person that delivers food to an unknown address, knocks on the door, and enters a residence that he is unfamiliar with, trusting someone that he does not know, without any means of protecting himself other than a cell phone that he might carry with himself. Should the person inside mean harm to the delivery person, the delivery person is not prepared to properly defend himself, and there is no quick and easy way for anyone to assist him out of danger.

As another example, realtors take calls from total strangers, wanting to see a house that is listed for sale. They meet the individual at the house, which in many cases is vacant, and enter the house at risk. They walk together throughout the house, enter rooms, visit basement, garage, and all parts of the house, not knowing if the caller is a trustworthy person or not. We have reports of many incidents of realtors getting hurt or even killed in such circumstances. In many cases no-one finds out about the incident until it is far too late. The body of the person is found days after the incident, when the family or friends notice the person missing.

There are personal digital assistance device software applications that are marketed as personal security systems. There are many short-comings of these tools such as: i) they offer assistance when the user is alert and capable of asking for it, ii) they rely on cellular system and do not work when there is no cell reception, iii) they require the user to have their cell phone with them at all time or have access to them and interact with them repeatedly, and iv) they reach out to remote helpers, such as police and 911, as the first line of defense. These are some of the short comings among others more specific to each product. Though emergency services are helpful, they are remote and take time to get to the site of danger, giving enough time for the assailant to complete the task and leave the location.

SUMMARY

Embodiment of the present disclosure relates to a system that uses several means to summon assistance by the user. The first line of defense for the user is fear in the mind of the assailant. The system uses loud noise and sound that inform the assailant that the situation is not private and quiet anymore and others could be rushing soon to intervene. This will discombobulate the assailant and instill fear. The disruption to the quiet mode of the environment of the assailant will cause unexpected confusion that will cause the assailant to reconsider the planned dangerous act.

The second line of defense is informing remote services of the presence of danger and possible imminent crime, asking for assistance.

In circumstance where there is danger of harm, the first action is to distract the assailant and buy time to get oneself out of the immediate danger area. The second action is to deter the assailant from the act, causing them to flee the environment; third is to gather information that would help law enforcement officers to apprehend the assailant. Of course the main focus should always be to protect the individual that is being targeted, at all cost.

Psychologically, a person who is in fear of their life and are target of a potential harmful attack, would only be focused on how to physically protect themselves. It would be next to impossible for them to remember to operate a sophisticated electronic system. For example, it would be impossible to expect that a person who is facing an assailant to pull out their cell phone, unlock it, dial a number for help, and tell them what is going on. Even if the person was capable of doing this, the assailant would certainly intervene and prevent the person from completing the task.

The embodiment of the present disclosure contains a simple trigger device that is carried by the person while entering a Danger Zone. The main subsystem, Control Unit, is one that is not with the user, hence does not require direct, manual interaction from the user, and cannot be disabled by the assailant. The Control Unit of the system is normally placed outside the Danger Zone and cannot be noticed, reached, or disabled by an assailant.

The said Control Unit is capable of initiating all calls for help, including local calls from the people in the vicinity, and calls to persons and services remote to the site of danger.

The system's triggering device that is conspicuously carried with the user, while in the Danger Zone. Upon presence of danger, the user uses the triggering device to initiate the rescue process. Upon initiation of the rescue process, the control system starts a predetermined sequence of actions that is created to instill fear in the assailant, inform people in the immediate vicinity of the attack in progress and ask for help, and finally reach out to remote services for apprehension support.

BRIEF DESCRIPTION OF THE DRAWINGS

The accompanying drawings illustrate non-limiting example embodiments of the invention.

DETAILED DESCRIPTION

Throughout the following description, specific details are set forth in order to provide more thorough understanding of the invention. However, the invention may be practiced without these particulars. In other instances, well known elements have not been shown or described in detail in order to avoid unnecessary obscuring the invention. The drawings show, by way of illustration, specific embodiments in which the invention may be practiced. These embodiments may be combined, other elements may be utilized or structural or logical changes may be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usage between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more". In this document, the term "or" is used to refer to a nonexclusive or, such that "A, B or C" includes "A only", "B only", "C only", "A and B", "B and C", "A and C", and "A, B, and C", unless otherwise indicated. In the appended aspects or claims, the terms "first", "second", and "third", etc. are used merely as labels, and are not intended to impose numerical requirements on their objects.

Overview

Embodiment of the present disclosure relates to a assistance system and methods for using this assistance system to summon assistance to help the user that is either under threat of being harmed, in the process of being harmed, or has already been harmed. Currently, there are many situations where individuals step in to, due to their job requirements, or their personal choice, that might put them in danger of harm. For example, someone who drives to a remote location, parks his car and goes through a remote path to jog, is unaware of the surrounding and surprises that could be waiting for him. In another case, a realtor that alone hosts an open-house and invites strangers to walk in and throughout the house, does not know the visitors and is not aware of their intentions.

There are software systems on the market that use the capabilities of a cell phone to allow the user to call for assistance from remote service providers such as police or 911.

These systems have many short comings that makes them unsuitable for situations where cell phone reception is not available, or the user is caught in full surprise and is not prepared to use the software service on the phone.

The present disclosure describes a Danger Zone Protection and Assistance System (DZPAS) comprised of multiple devices, and methods for using the system to bring about preparedness and readiness to address expected and unexpected threats and reach out for help to people and services, local and remote, to fend off the assailant, and stop the threat harm from being realized. Such system will give the user the protection they need under most circumstances. Of course no system will replace being vigilant and careful, and preventing oneself from being in situations of danger to begin with. But for people whose job always has a risk of unexpected harm, the system described here provides a stronger layer of protection.

Over the past 50 years, the advancement of mobile communication technology, mobile microprocessor based computing devices, various methods of short and long distance communication, and a vast grid of network communication available throughout the world, has enabled new solutions to emerge for age old problems.

The embodiments of the present disclosure address the need for a system to recognize that when the user is facing an imminent threat from an assailant, the user would have to focus time and energy to stop the assailant, remove herself from the situation, slow down the process until help arrives, defend herself, or any other act that is appropriate and available in those one-on-one circumstance. As such, the system should require minimal interaction with the user, allowing the user to focus on saving herself, and do whatever is necessary to help the user by bringing other people to her aid.

The system breaks down the environment in to: 1) a Danger Zone (DZ) where the user is to step in to, 2) the Local Assistance Zone (LAZ) that is immediately outside the DZ, and 3) the Remote Assistance Zone (RAZ) that is far from the DZ. In all cases, the user travels through the LAZ in order to reach the DZ.

The system comprises of: 1) a Personal Trigger (PT) that is carried by the user while in the DZ, 2) a Secured Local Monitoring Device (SLMD) which is placed in a secured location in the LAZ, 3) a software application (SAPP) that runs on an external computing device such as a laptop or a cell phone used for set up and information exchange with the SLMD, and 4) a Remote Backup Storage (RBS) that is used to save information collected by SLMD for protection and future use.

PT is a battery operated device that is easy to carry and uses the energy from the battery to wirelessly communicate a signal to the SLMD. In an embodiment, PT has a button that is programmed to send the triggering message when it is pushed down, or when it is released from the depressed position. PT has no intelligence and relies on the user to assess the situation and use the button on the PT to initial the call for assistance. When the user uses button to initiate the call for assistance, the PT will use its internal electronics to generate a wireless call for assistance to its paired SLMD. The wireless method of communication can be Bluetooth, Wifi, or any other method available. In the preferred embodiment, the PT uses long-range radio frequency (RF) signal to communicate its call for assistance to the SLMD. In an embodiment, the PZ is an intelligent device that has the capability to monitor the environment and sensed physiological information from the user, and based on that information and its intelligent software make the determination that the user is in danger and automatically communicate a message to SLMD, reporting of the conditions and the need for assistance. In an embodiment, PZ has a camera that can collect video information and immediately transmit them to the SLMD.

SLMD is a microprocessor based device that operates using an internal battery. In a preferred embodiment, the SLMD uses a rechargeable battery, and has the means to connect to an external power source for recharging. The internal battery will make SLMD independent of the need for energy source, and makes it portable and usable in any condition. SLMD has an RF receiver that is key paired with a PT. During the setup process, a PT is paired with a SLMD such that the particular SLMD only listens and reacts to the call for assistance from its paired PT.

SLMD can be placed inside the car that the user uses to reach the DZ. Typically, the car is parked in the LAZ, while the user steps in the DZ, making the car the most secured place for the SLMD, and easily reachable by the PT's wireless signal for communication.

SLMD has capability to trigger external devices that can be used to attract attention from people in the LAZ. One such device is an Emergency Warning Light Device (EWLD), similar to lights that are used by Police and other emergency services. In situations where SLMD is inside a car, the EWLD is place on top of the car and secured using suction cups, magnet, or any other means necessary.

SLMD further comprises a microphone, a loud speaker, an internal sound generator, an sound amplifier, and a voice recording and playback capability (AVR). While the sound generator, recorder and playback circuitries are inside the SLMD, the loud speaker is placed outside the SLMD in a location that allows its message to freely travel the air and reach people outside and inside the DZ. The user uses the microphone to record a message that should be sent to individuals or public assistance services, should a call for assistance be initiated. The recorded message shall contain the name of the person, the location she is in, the nature of the visit, call for immediate assistance, and any other information that may be necessary for expediting the call, and shortening the duration for assistance from groups remote to the site. This recording is done by user prior to entering each DZ.

SLMD further comprises a Bluetooth communication system that allows the SLMD to pair with an external computing device, such as the user's computer, for set up and information exchange. User can pair any computing device such as a Bluetooth enabled cell phone, a laptop, a portable pad, etc with the SLMD to customize the SLMD and its actions to each DZ. Once at a DZ, the user will connect with SLMD using the Bluetooth connection and enter the relevant phone numbers for individuals in the immediate vicinity, and emergency assistance services that service the area so that they can be called for help if the need arises.

SLMD further comprises a Cellular Communication Circuitry (CCC) that can be used to communicate with individuals and agencies, using the list of previously stored phone numbers.

Once the user has initiated a call for assistance, by using PT, the internal software in SLMD will initiate the onboard process for bringing assistance to help of the user. The first step in the process is to use the AVR to sound the siren and start the lights on EWLD to reach people in LAZ and ask for help. AVR will communicate through the loud speaker that the user is in danger and is in need of help. This step will continue indefinitely until it is stopped by the user. Following the call for assistance from people in LAZ, SLMD will use CCC and the phone number list, to call each number on the list, and deliver the pre-recorded message that includes the name of the user, the address of the location, the GPS coordinates (if available), and the message indicating presence of danger and a need for help.

Should the call for assistance be initiated by the user though the PT, the only way to stop the process would be for the PT to enter the secured zone where the SLMD is stored, and press the stop button on the unit, indicating that the user is outside the DZ, and is secured.

SAPP is a software application that the user places on a Bluetooth enabled computing device such as mobile cell phone. The user will pair the computing device with SLMD using Bluetooth technology. Once the two devices are paired, SAPP will use the Bluetooth connection to talk to the onboard software in SLMD. SAPP will allow the user to customize SLMD by programming specific phone numbers in the SLMD call list. SAPP will allow the user to customize other features of SLMD such as what kind of siren should be sounded, how the PT should operate, among other programmable features made available to the user.

RBS is a information storage device or service that is remote to the SLMD and the DZ. RBS is reachable via internet only. SLMD can communicate with RBS through WiFi communication protocol, only. Upon entering a known WiFi zone, SLMD shall connect to the internet using the WiFi connection, and reach the RBS system and transmit all information stored in its internal storage to the RBS.

In an embodiment, SLMD further comprises a Global Positioning System (GPS) that uses satellite information to identify the position of the SLMD, where GPS signal is available. This information is transmitted to emergency services and people remote to the site, in case calls for help are initiated.

A Danger Zone Protection and Assistance System, as described herein, can further include a Video Monitoring System (VMS) with multiple cameras placed within the DZ to record people and activities inside the DZ and communicate those recordings to the SLMD for storage and future use.

VMS comprises of a Central Video Processing Unit (CVPU) that wirelessly connects to one or more cameras, collects video streams from each camera, timestamps the recording, combines them, possible store them on its local storage unit, and/or possible communicates those recordings to the SLMD for further storage and safekeeping.

VMS comprises one or more self powered cameras that can be placed in any location within the DZ. Said cameras can video monitor the field of view, and transmit the video of their observations to the CVPU. CVPU can then use its wireless communication means to communicate the collected video to the SLMD for storage and use as decided by the SLMD.

As an example, the system is used by a real estate agent (Realtor) in the process of showing a vacant house to a stranger who is interested in viewing the house. In such circumstances the house is empty and the two strangers, the Realtor and the Client, go inside the house for showing. In this example, the house is the Danger Zone. The Realtor places the SLMD inside his personal car. In the ideal situation, SLMD has been permanently installed inside the trunk of the car, in a secured position, with the loud speaker under the hood.

Upon reaching the house, the Realtor will use the AVR to record the information about the site inside SLMD, places the EWLD on top of the car or in the back window, tests the operation of the PT, and initiates the monitoring process by flipping a switch on SLMD. Once the system is in monitor mode, Realtor will exit his car, and lock the car, taking the PT with him to the visit.

While inside the house and showing the house to Client, if Realtor feels in danger, or is facing an imminent threat, he will use PT to initiate a call for assistance. Since SLMD is in monitoring mode, it will receive the signal from PT, and initiate the Call for Assistance Process. SLMD will start the siren through the loud speaker, with periodic output of the personal message from the Realtor indication his need for help. SLMD will simultaneously start the light show on the EWLD. Both of these mechanisms are meant to attract attention and assistance from local residents or pedestrians in the immediate vicinity of the house. The sound will be loud enough to reach the assailant and may raise fear that might stop the threatening situation.

Additionally, SLMD will initiate calls to all numbers provided by the Realtor, and communicate the call for assistance to them. One all the calls are placed and acknowledged by the receivers, and the local call for assistance initiate and ongoing, SLMD has reached the end of the process and will be in wait mode.

Once the threat is eliminated, and the user out of the Danger Zone, the user has to come back to the car, where SLMD is stored, and initiate the Danger Termination Process.

Upon initiating the Danger Termination Process, SLMD will stop the EWLD, terminate the message communication and siren active on the loud speaker, and will reach out to phone numbers on the call list informing them that the threat has been eliminated and the user is in a safe location.

DEFINITIONS

As used herein, "Danger Zone" refers to a geographic area where risk of physical harm may be present. The geographic area could be a house that is physically limited and defined by its exterior walls, or a park that is defined but is not defined by physical barriers.

As used herein, "Personal Trigger" refers to a portable device that is powered, carried by a person, and has the means of generating at least one wireless message signal, either automatically or manually. For example, a Personal Trigger could be a simple remote control unit with a simple wireless signal generation means, or a intelligent unit that is carried by, or on the, user and can automatically detect hazard and generate a wireless message to a paired receiver.

As used herein, "Control Unit" or "Secured Local Monitoring Device, refers to a box that contains electronic circuitry used to control mechanisms and other pieces of electronics in harmony with one another. The Control Unit could be in a dedicated housing that is meant to protect its components from accidental damage, and secure if from intentional, unauthorized interference.

As used herein, "Call For Assistance Process" refers to a predetermined sequence of actions that are used to solicit assistance from people outside the Danger Zone. People outside the Danger Zone could be in close vicinity of the Danger Zone, or far remote to it. The actions may include, sounding an audible alarm, initiating a visual emergency light signals, a cellular call to known people, a cellular call to emergency personnel, etc.

As used herein, "Call for Termination Process" refers to a predetermines sequence of actions that are used to stop any assistance that has been summoned by the previous Call For Assistance Process, that has not yet been completed. For example, if a third party has been called and asked for help, and the danger has been resolved, the Call for Termination Process will let them know that the danger has passed and they do not need to take any action.

As used herein, "Video Processing Unit" refers to an electronic circuitry capable of receiving video signals from one or more cameras, storing them in its internal memory, and transmitting them to a receiver.

As used herein, "Emergency Assistance Services" refers to the public or private organizations that provide assistance to people in distress, such as police, fire department, and 911.

As used herein, "multiplexer" refers to a electronic hardware system that is capable of combining images from 2 or more cameras in to a single video stream.

As used herein, "video storage" refers to an electronic system that can store video stream such that the stream can be recreated from the stored information.

As used herein, "sounding audio alarm" refers to generating an audio signal that is audible by human beings such that is distinguishable from other sounds in the area, and is notably unusual, or is similar to an audio signal that is used by public emergency services.

As used herein, "visualizing visual alarm" refers to displaying a visual display that is easily visible by human beings and is bright enough, and in a sequence that attracts attention as unusual, or similar to light sequences that are used by public emergency services.

As used herein, "house security monitoring system" refers to commercially available systems that include sensors and control units that monitor security of homes. Such systems have sensors such as window sensor, motion detection, etc. that monitor the activities inside a house. They also have keyboards that arm and disarm the system, and possible external monitoring services that monitor the activity inside a house and alert security services in case of an intruder.

DESCRIPTION

Figure 1:
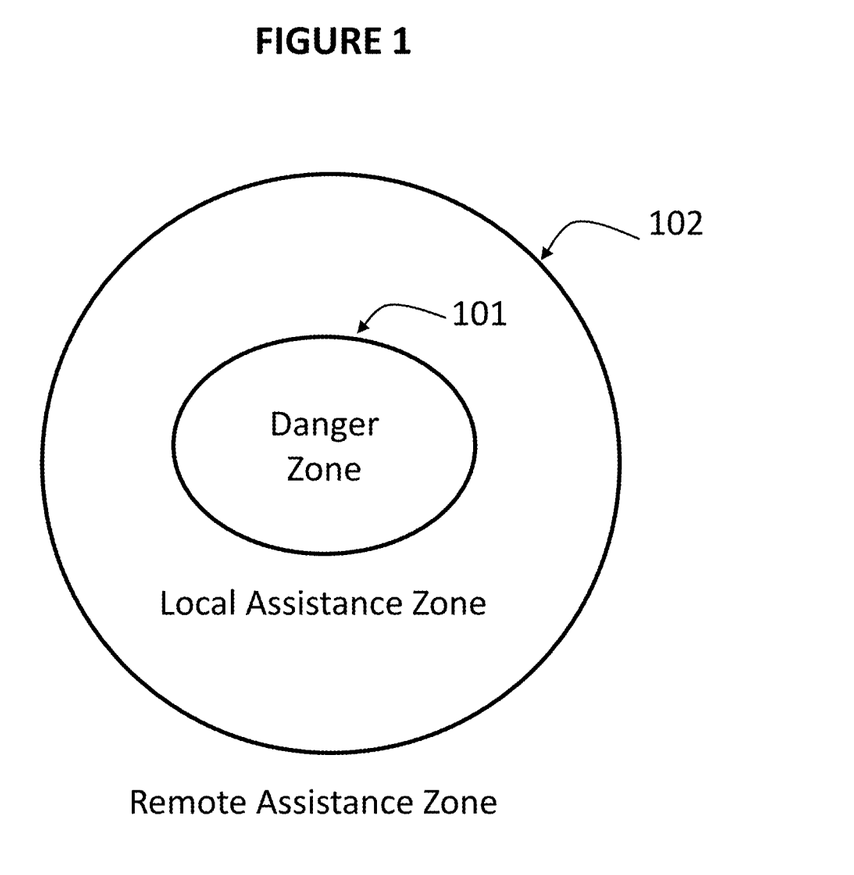
FIG. 1 is a view of the three zones, including the Danger Zone, where the user is typically in, the Local Assistance Zone, where assistance can be provided in seconds, and Remote Assistance Zone, where assistance can be provided in minutes.

FIG. 1 illustrates the various zones of operation that the Danger Zone Protection and Assistance System works with. Danger Zone of 101 is defined as an area where the user will be stepping in to with the Personal Trigger device. Local Assistance Zone of 102 is an area just outside the Danger Zone, where the SLMD will be located in. SLMD must be located within 102, such that the PT is in range of communication with SLMD from anywhere inside the DZ. LAZ is also the area where the SLMZ can be seen and heard by people housed within it, or passing through it. The entire area outside the 102 is considered Remote Assistance Zone. It is expected that anyone within RAZ would have to travel by a vehicle to reach the DZ within a relatively short time frame.

Figure 2:
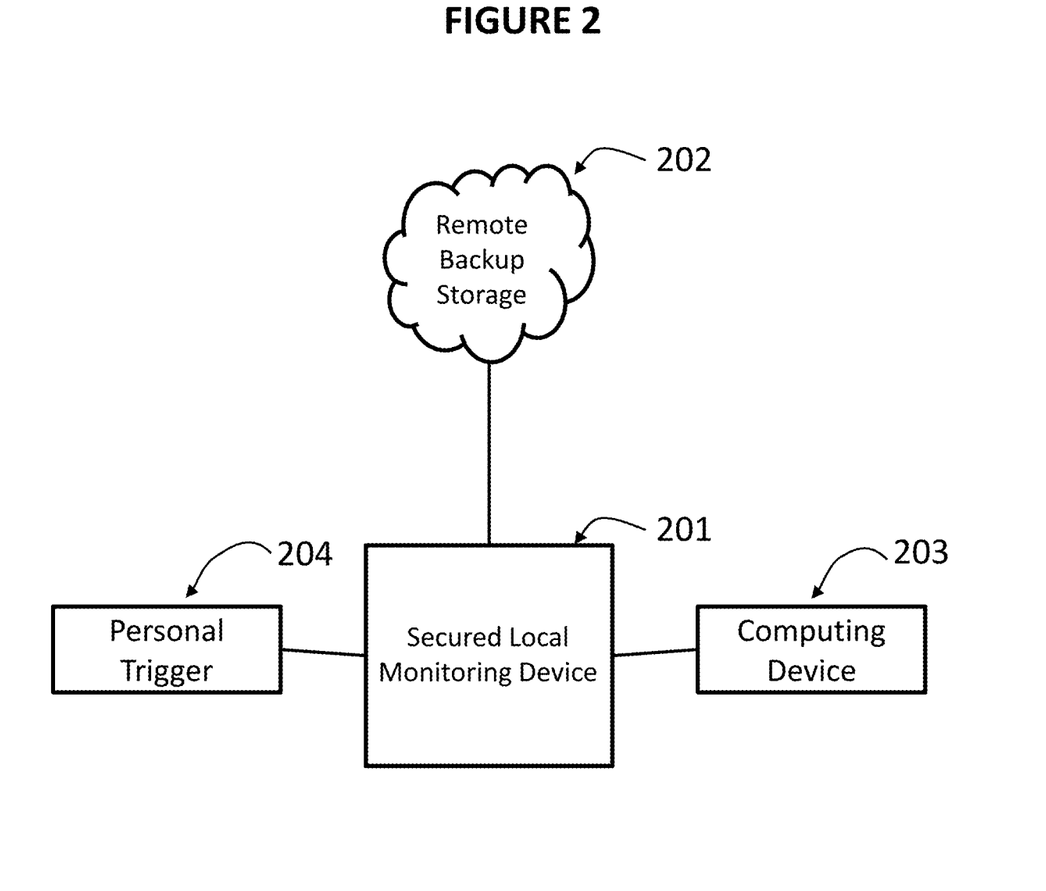
FIG. 2 is a diagram of the system, showing all subsystems. It shows a Personal Trigger that is used by the user, a Secured Local Monitoring Device that contains information processing and electronic control circuitry, and supply uninterruptable power to it, and a Computing Device that can be used to provide information to the Control Unit to customize its operation.

FIG. 2 illustrates the basic components of the DZPAS. Secured Local Monitoring Device of 201 is the heart of the system and the central information processing, and decision control component of the system. Computing Device (CD) of 203 is a standalone laptop, PDA, or any other form of computing system that can run the DZPAS software application on it. CD of 203 uses wireless communication protocol to connect with SLMD of 202 for customization, programming, and data exchange. Personal Trigger of 204 is a handheld device that is carried around by the user while inside the DZ. PT uses wireless communication protocols, such as RF communication signal to communicate with the SLMD and inform the SLMD of the presence of danger. SLMD will then use the public communication networks to reach people and groups to ask for assistance. The Remote Backup Storage (RBS) of 202 is an external system, such as a cloud server, the connects with SLMD via high-speed wireless communication protocols. SLMD uses RBS as means of back up information and data collected from interaction with each DZ that the user have visited since the prior connection and backup.

Figure 3:
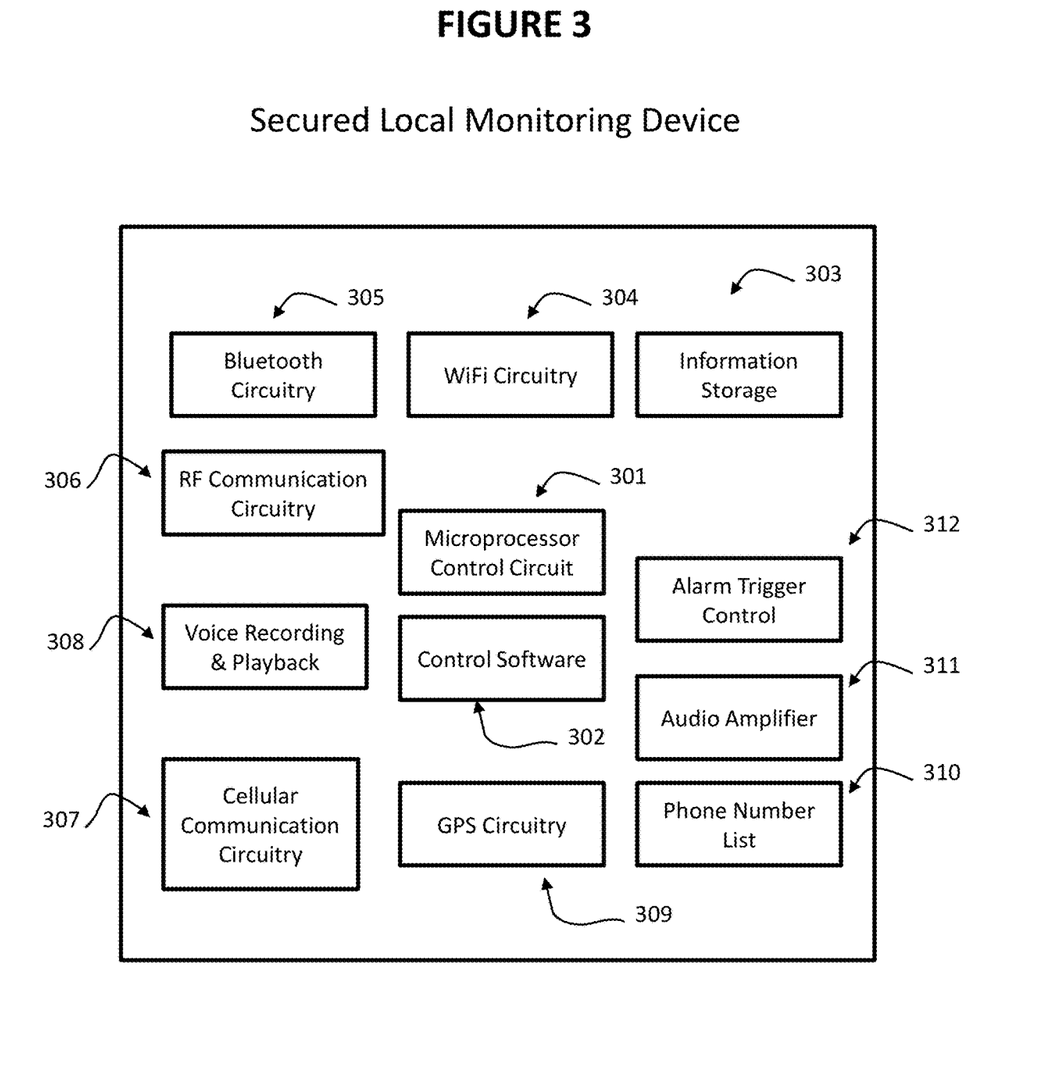
FIG. 3 is a schematic view of the Control Unit, showing the breakdown of the various features and capabilities of the unit.

FIG. 3. Illustrates the internals of the SLMD. SLMD is controlled by the microprocessor control circuitry of 301, which contains a microprocessor, cache memory, and support components that allow the circuitry of 301, use the control software of 302, and manage all other components of the SLMD. Information storage of 303 is used for collection of any information such as, text, voice and video data communicated by other subsystems of the DZPAS. This information is then uploaded to a cloud service using the WiFi Circuitry of 304. The RF Communication Circuitry of 306 uses its monitoring capability to look for an RF signal that might come from the Personal Trigger device. Once 306 receives a trigger message from the PT, it informs 301. 301 will then use Alarm Trigger Control of 312 to initiate visual and audio alarms connected to SLMD. 301 will also use the audio message recorded by Voice recording and Playback of 308, to output the previously recorded message through the Audio Amplifier of 311, which is externally connected to a loud speaker. 301, further initiates the remote call process though the Cellular Communication Circuitry of 307, by using the message stored in 308 by the user, and the current location of SLMD that is collected via GPS Circuitry of 309, and place a cellular voice call to phone numbers provided by the user in Phone Number List of 310. Upon reaching a person at the other end of each phone call, 301 plays the call for assistance message assembled by all the information from 308, 309 and 302, ask for confirmation from the user, and then proceed to the next number on the list, until all numbers are reached and message is delivered, or the process is terminated by the user.

Figure 4:
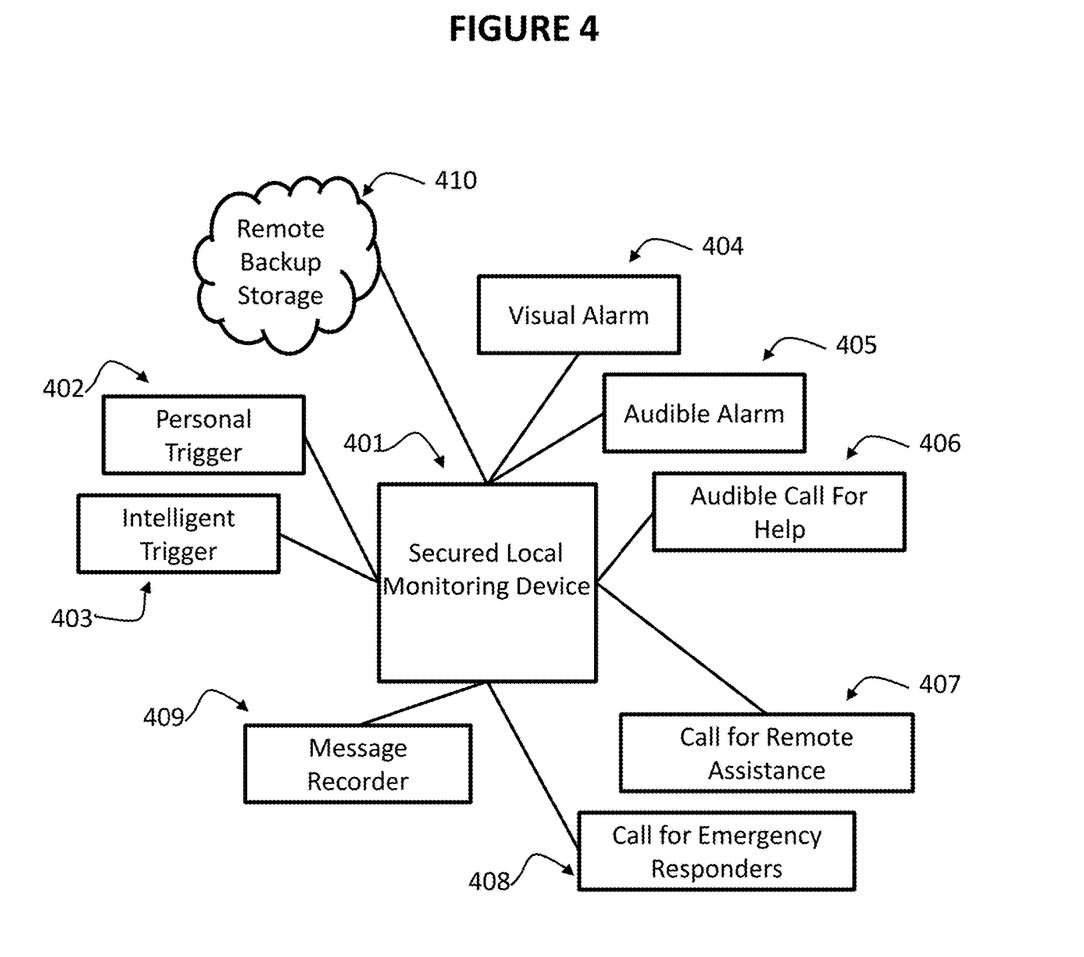
FIG. 4 is a schematic diagram of the system with all the components, interconnections, and their interactions.

FIG. 4. Illustrates the capabilities of the DZPAS system. System contains the SLMD of 401 which is the main processing unit of the system. Personal trigger of 402 is a simple device that contains a triggering mechanism, such as button, the initiate a wireless signal transmission intended for SLMD. The Intelligent Trigger of 403, is a more complicated device, such as wrist watch like device, that monitors the vital signs of the user and the sound from the environment, and has the intelligence to decide that there is danger present and the user is in need of help. Trigger devices of 402 and 403 are the mechanisms that start the Call for Assistance Process through the SLMD. SLMD is capable of outputting visual alarms 404, audible alarms 405, and voice messages 406 from the user. The visual alarm of 404 is a system of flashing and strobe lights that are meant to attract visual attention of people in the immediate field of view, perhaps no less than 100 feet. The audio alarm of 405 is a siren like loud sound that is outputted from the loud speaker connected to SLMD. The audible call for assistance of 406 is a personal message in the voice of the user, that is outputted using the loud speaker connected to SLMD. The audible sounds from 405 and 406 are intended to be loud enough to audible in the geographic area in the immediate vicinity of SLMD of at least 100 feet. Call For Assistance of 407, and Call for Emergency Responders of 408 are phone calls meant for reaching people who have to travel to reach the Danger Zone, but their presence at the DZ would have affect in terminating the danger. The Message Recorder of 409 is used by the user to record a call for assistance that would be outputted using 406, and a call for assistance message that identifies the exact location of the DZ, down to a small variation, plus any additional information that the receiver of the call would find useful to immediately reach the user. Remote backup storage of 410 is a system such as personal information storage device, or a cloud server, or any other means of information storage that is remote to the SLMD and cannot physically be reached by a person. The storage device of 410 is used by SLMD to wirelessly transmit its stored information for safe keeping and storage.

Figure 5:
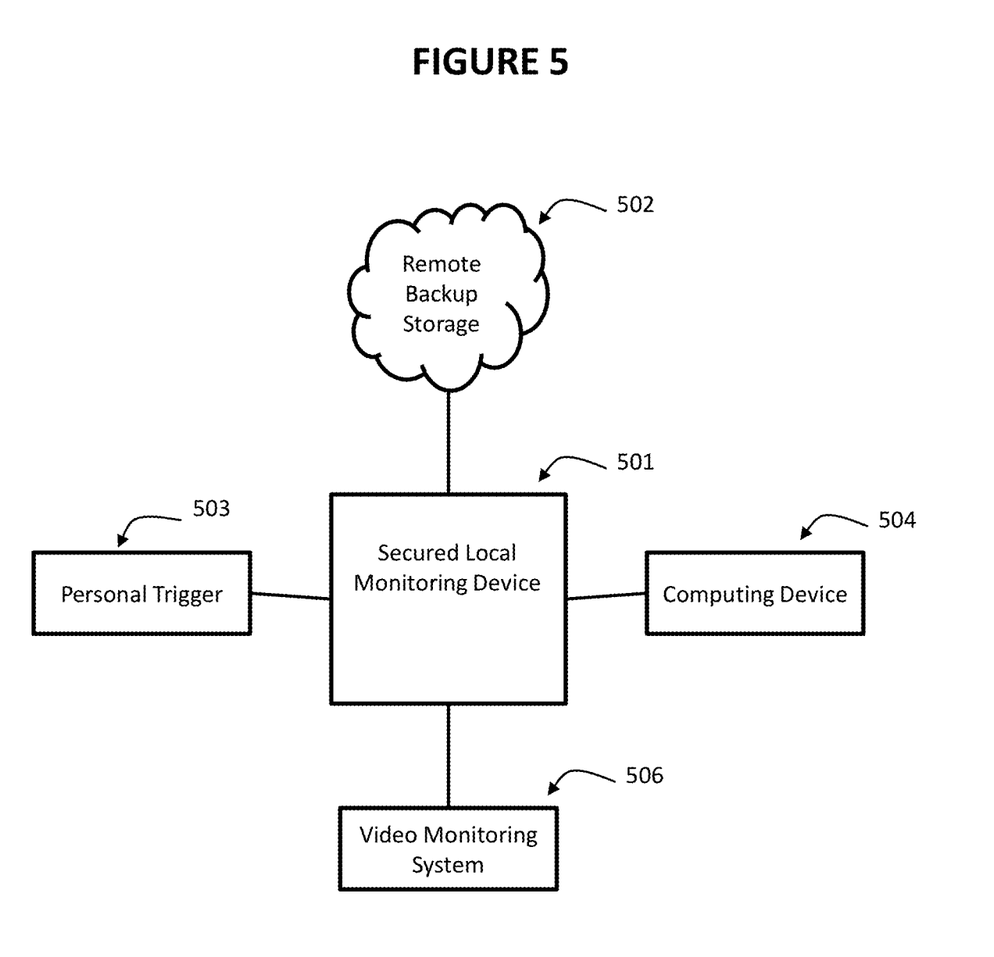
FIG. 5 is a diagram of the system, including video monitoring capability.

FIG. 5. Illustrates an embodiment of the DZPAS that contains a Video Monitoring System 506. In addition to all the features of DZPAS described above, this configuration of the system uses a Video Monitoring System that contains video cameras, and a central video processor. The processed and compressed video from the VMS of 506 is sent to SLMD of 501 and then stored on RMS of 502 for possible playback should it be needed. In situations where a visitor has acted in a threatening manner, and the intervention from the SLMD has caused the assailant to flee the site, the video from Video Monitoring System can be used to review the situation and find information that would allow law enforcement agencies to locate and apprehend the assailant.

Figure 6:
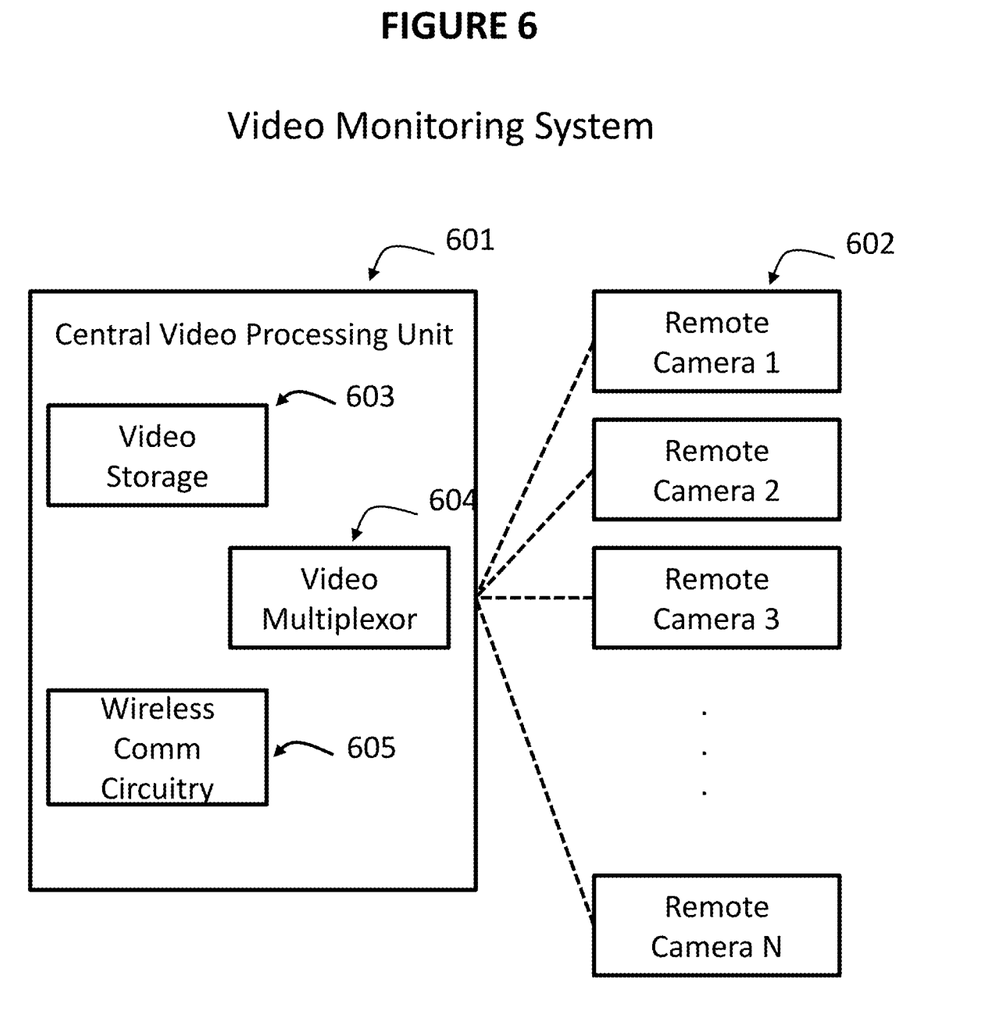
FIG. 6 is a schematic view of the Video Monitoring System

FIG. 6. Illustrates the components of the Video Monitoring System. The VMS contains a Central Video Processing Unit of 601, which further comprises of a video multiplexor of 604, a video storage of 603, and a wireless communication of 605. VMS further comprises of a group of cameras in 602. The number of cameras in each situation will depend on the need of the location and capabilities of the system. The cameras of 602 will collect video from each location and transmit them to the video multiplexer of 604, where they are put together in a sequence of combination so that they are more easily handled and stored. The compounded video information from the multiplexer is then stored in the video storage of 603 for future use. The VMS uses the wireless communication circuitry of 605 to transfer the stored video information to the SLMD of the system.

Figure 7:
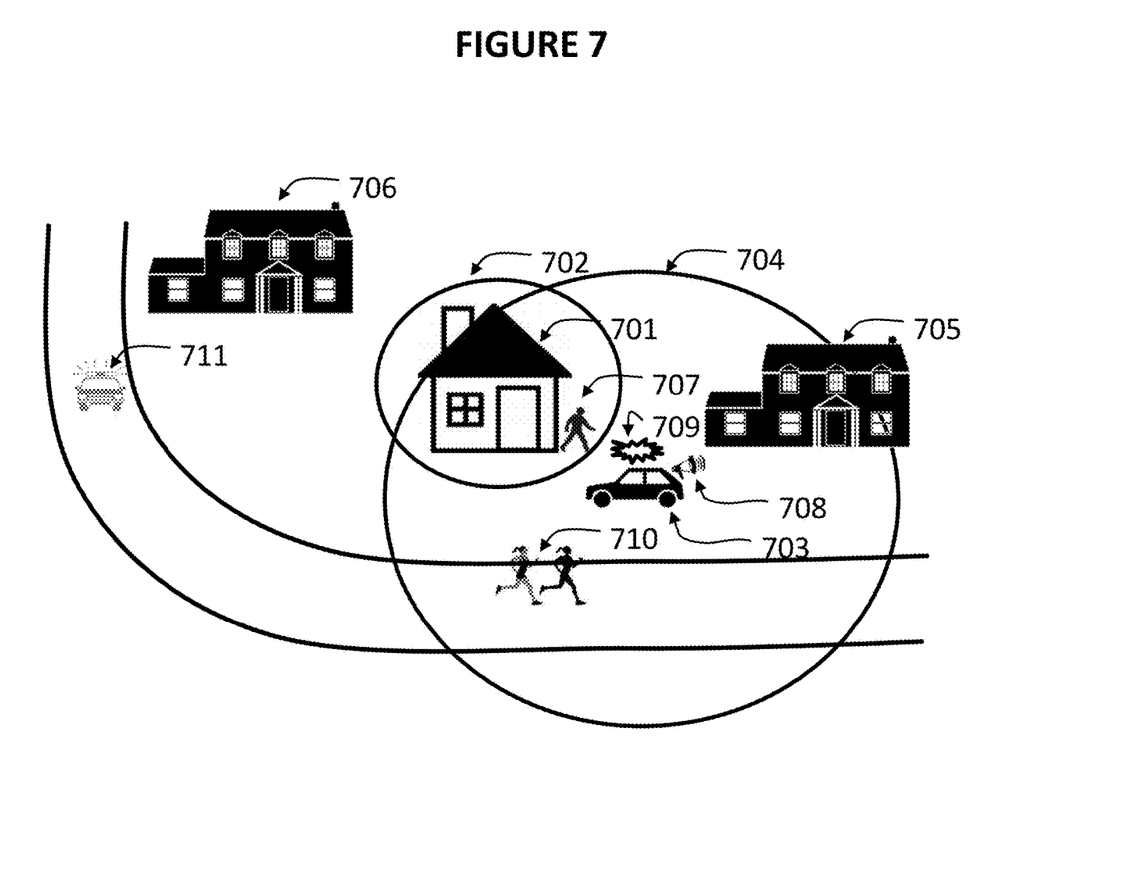
FIG. 7 is a diagram of application of the system in a real estate property showing situation.

FIG. 7. Illustrates an application of the invention where it is used in a situation where a real estate broker has to show a house to a new interested party. In this situation the house of 701 is located in the Danger Zone of 702. The Realtor of 707 arrives with her car of 703 to the house. The car is parked outside of the house and the SLMD placed inside the car. The loud speaker of 708 is installed under the hood of the car, and the emergency warning light device of 709 placed either on the car or inside the car such that its light emission could travel freely without obstruction. The Local Assistance Zone of 704 is formed with the car of 703 as the center of the range. The sound from 708 and light from 709 could be heard and seen by the pedestrians of 710 and house of 705. Any person within the LAZ of 704 could hear or see the alarm from the car of 703 should the SLMD start the Call for Assistance Process. The Realtor of 707 turns on the SLMD inside the car, records her emergency help message, locks the car, and goes inside the house with the Personal Trigger that is placed on her keychain. In some cases the triggering device could be a Intelligent Trigger device. In the event of the threat of danger, the Realtor of 707 will use her PZ to alert the SLMD inside the car 703. The car 703 will initiate the sound and light process within the LAZ to attract attention of pedestrians of 701 and residents of 705 and any other houses or pedestrians that could be in the LAZ. Additionally, the SLMD will initiate call to Emergency Assistance Services to summon help from emergency personnel of 711.

A Danger Zone Protection and Assistance System, as described herein, can include any of the above examples and can comprise: a trigger device, a secured local monitoring device, a visual alarm. An example can include the above example and an audible alarm. An example can include any of the above examples and a cellular communication means to reach out to remote services for help. An example can include any of the above examples with an intelligent trigger that can automatically detect presence of danger and decide to initiate the call process without intervention from the user. An example can include any of the above examples with a WiFi communication means to allow the SLMD to communicate with remote storage devices. An example can include any of the above with a camera system to collect video information from the DZ. An example can include any of the above examples with a set of video cameras that collect video information, combines them for efficiency and transmits them to remote location for storage and post viewing. An example can include any of the above examples with one or more cameras that can be monitored in real time from remote locations through the SLMD and its connection with the said cameras. An example can include any of the above with the SLMD capable of communicating with the in-house security monitoring system and communicate messages to outside by triggering the security system alarm. An example can include any of the above examples with the SLMD capable of communicating with the in-house security monitoring system and triggering the security alarm process when the user triggers their Personal Trigger.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

What is claimed is:

1. A security system comprising:
    a Portable Control Unit, comprising:
        a microprocessor circuitry that runs a single customizable application software, and
        an electronic circuitry that can turn on/off electronic devices external to the Portable Control Unit, and
        an application software routine that controls the activities of one or more electronically operated devices that are connected to the Portable Control Unit housing through means of wired or wireless connection, and
        a wireless communication circuitry dedicated to only receive messages from a single predetermined Personal Trigger, and
        an electronic circuit for communicating human understandable messages to one or more persons in remote locations, and
        an electronic circuit for communicating the location of the Portable Control Unit to at least one person; and
    a Danger Zone defined as a geographic area of up to 5 miles in radius adjacent to the location of the said Portable Control Unit; and
    the Personal Trigger detached from the Portable Control Unit, that is carried around by a person while in the Danger Zone, and is used to manually initiate a predetermined sequence of actions within the said Portable Control Unit, wherein the predetermined sequence of action includes initiating a pre-recorded audio playback via a loud speaker, a remote call process, and one or more of a visual alarm and an audio alarm; and
    a computing device used to customize the operation of the single customizable application software within the Portable Control Unit, wherein the customizing includes programming relevant phone numbers into a call list of the remote call process according to the Danger Zone and customizing a pre-recorded audio playback according to the Danger Zone.

2. The security system of claim 1, wherein the electronic circuitry for communicating messages to at least one person further comprises a loud speaker.

3. The security system of claim 1, wherein the Control Unit further comprises an electronic circuitry for storing user generated voice messages.

4. The security system of claim 1, wherein the electronic circuitry for communicating messages to at least one person, further comprises a cellular communication circuitry.

5. The security system of claim 2, wherein the said loud speaker is used to communicate a pre-recorded human understandable messages to people in area adjacent to the Portable Control Unit.

6. The security system of claim 1, wherein the system further comprises a visual light source, controlled by the on/off capability of the Portable Control Unit.

7. The security system of Claim 1, wherein the Portable Control Unit further comprises an electronic circuitry capable of receiving, storing and transmitting the video signals.

8. The security system of claim 7, wherein the system is further comprised of:
    one or more video cameras that can collect video information through their integrated lens and transmit the said video information to a Video Processing Unit; and
    a Video Processing Unit that comprises:
        an electronic circuitry to collect video signals from one or more video cameras, and
        an electronic circuitry to combine and compress video signals from two or more cameras, and
        an electronic circuitry to receive and transmit the said compressed video signals to the Portable Control Unit.

9. The security system of claim 5, wherein the cellular communication circuitry is used to communicate pre-recorded human understandable messages to people in remote locations.

10. The security system of claim 1, wherein the Personal Trigger further comprises an electronic circuitry for collecting and transmitting voice signals; and the Portable Control Unit has an electronic circuitry for receiving and storing voice signal from the Personal Trigger.

11. The security system of claim 1, wherein the Portable Control Unit further comprises an electronic circuitry for communicating the location of the Personal Trigger to at least one person.

12. A method of operating a personal security system within a Danger Zone, having:
    at least one loud speaker; and
    a Portable Control Unit comprising:
        an electronic circuitry for cellular communication, and
        an electronic circuitry for receiving wireless signals from a predetermined Personal Trigger, and
        an electronic circuitry to playback a pre-recorded human voice message; and
    at least one Personal Trigger detached from the Portable Control Unit, used to manually transmit an activation signal for initiating a predetermined sequence of actions within the said Portable Control Unit, wherein the predetermined sequence of action includes initiating a pre-recorded audio playback via a loud speaker, a remote call process, and one or more of a visual alarm and an audio alarm ; the method comprising:
        prior to entering the Danger Zone, using a computing device to customize the operation of a single customizable application software within the Portable Control Unit, wherein the customizing includes programming relevant phone numbers into a call list of the remote call according to the Danger Zone and customizing a pre-recorded audio playback according to the Danger Zone, and
        while inside the Danger zone using the Personal Trigger to activate a sequence of events within the Portable Control unit, consisting of:

initiate at least one cellular voice call for assistance from pre-determined people remote to the Portable Control Unit; and initiate playback of at least one said pre-recorded human voice message through the said loud speaker.

13. Personal security system of claim 12, wherein the cellular voice call contains the physical address of the Portable Control Unit.

14. Personal security system of claim 12, wherein the human understandable message contains the physical location of the Personal Trigger.

15. A security system comprising:
a Danger Zone defined as a geographic area of up to 5 miles in radius; and
a Vehicle located adjacent to the Danger Zone; and
a Control Unit placed inside the said vehicle, comprised of:
  a customizable application software that controls the operation of the components and circuitry inside the Control Unit; and
  an electronic circuitry for communicating at least one predetermined Personal Trigger, and
  an electronic circuitry to collect and store pre-recorded human voice messages, and
  an electronic circuitry used playback the pre-recorded messages to people in the vehicle surrounding, and
  an electronic circuitry for communicating the location of the person in danger to people remote to the Danger Zone, and
  an electronic circuitry used for communicating the pre-recorded messages to people remote to the Danger Zone; and
a Personal Trigger detached from the Vehicle, carried around by a person while in the Danger Zone, and is used to manually initiate a predetermined sequence of actions within the said Portable Control Unit, wherein the predetermined sequence of action includes initiating a pre-recorded audio playback via a loud speaker, a remote call process, and one or more of a visual alarm and an audio alarm; and
a computing device used to customize the operation of the single customizable application software within the Portable Control Unit, wherein the customizing includes programming relevant phone numbers into a call list of the remote call process according to the Danger Zone and customizing a pre-recorded audio playback according to the Danger Zone.

16. The security system of claim 15, wherein the Personal Trigger communicates its message to the Control Unit using RF signal.

17. The security system of claim 15, wherein the Danger Zone is defined as a geographic area with a radius of five miles or less.

18. The security system of claim 15, wherein the cellular communication circuitry is used to communicate with people remote to the Danger Zone.

19. The security system of claim 15, wherein a loud speaker is used to output human voice messages, asking for help from people surrounding the vehicle.

* * * * *